(12) United States Patent
Ma et al.

(10) Patent No.: US 8,362,930 B2
(45) Date of Patent: Jan. 29, 2013

(54) PORTABLE ELECTRONIC DEVICE AND EXTERNAL KEYBOARD THEREOF

(75) Inventors: Hua-Qiao Ma, Shanghai (CN);
Tian-You Wang, Shanghai (CN)

(73) Assignees: Inventec Appliances (Shanghai) Co., Ltd., Shanghai (CN); Inventec Appliances Corp., Taipei (TW); Inventec Appliances Corp., Shanghai, Shanghai (CN)

( * ) Notice: Subject to any disclaimer, the term of this patent is extended or adjusted under 35 U.S.C. 154(b) by 391 days.

(21) Appl. No.: 12/854,324

(22) Filed: Aug. 11, 2010

(65) Prior Publication Data
US 2011/0063140 A1   Mar. 17, 2011

(30) Foreign Application Priority Data

Aug. 13, 2009   (CN) .......................... 2009 1 0056313

(51) Int. Cl.
*H03M 11/00* (2006.01)
*H01R 27/02* (2006.01)
(52) U.S. Cl. ......................................... 341/22; 439/638

(58) Field of Classification Search .................... 341/22; 361/679.08; 455/550.1; 345/168; 439/638
See application file for complete search history.

(56) References Cited

U.S. PATENT DOCUMENTS
6,628,961 B1 * 9/2003 Ho et al. .................... 455/554.1
* cited by examiner

*Primary Examiner* — Hieu Nguyen
(74) *Attorney, Agent, or Firm* — WPAT, P.C.; Anthony King

(57) ABSTRACT

The present invention relates to a portable electronic device and an external keyboard thereof. The portable electronic device comprises a first port comprising a circular earphone plug and a keyboard plug. The external keyboard comprises a main body, a keyboard array and a second port. The keyboard array is disposed on the main body and comprises a plurality of scan signal lines. The second port is electrically coupled to the scan signal lines of the keyboard array, and is capable of inserting into the first port of the portable electronic device so as to electrically couple to the keyboard plug. Therefore, the external keyboard can be connected to an earphone jack in a plug-and-play fashion without necessarity to add a new port such that the external keyboard is convenient to use and carry and can be freely rotated in any angle.

7 Claims, 5 Drawing Sheets

PORTABLE ELECTRONIC DEVICE AND EXTERNAL KEYBOARD THEREOF

BACKGROUND OF THE INVENTION

1. Field of the Invention

The present invention relates to a portable electronic device, and more specifically to a portable electronic device and its external keyboard.

2. Description of Related Art

In a conventional mobile phone, the existence of a keyboard of the mobile phone is a major issue for the screen size and the volume of the mobile phone. In recent years, a mobile phone having a "qwerty" keyboard (such as Palm and Blackberry) brings convenient operations to users, but the mobile phone is generally thicker and heavier or has a relatively smaller screen, which cannot be popular among customers. As the touch screen technology matures, present mobile phones tend to have a super thin design, and most mobile phones have omitted the keyboard by simply using the touch screen as an input interface. A typical example is Apple's iPhone. However, the mobile phones come with increasingly powerful functions, and become a portable recreation platform, and many manufacturers and content providers developed many games for mobile phones. Without a keyboard, it will be very difficult to play games or send mails from the mobile phones.

SUMMARY OF THE INVENTION

A technical problem to be solved according to the present invention is to provide an external keyboard of a portable electronic device which is convenient to use.

In order to solve the above-mentioned technical problem, an external keyboard of a portable electronic device is provided to couple to a first port of the portable electronic device. The first port comprises a circular earphone plug and a keyboard plug, and the external keyboard comprises a main body, a keyboard array and a second port. The keyboard array is disposed on the main body and comprises a plurality of scan signal lines. The second port is electrically coupled to the scan signal lines of the keyboard array, and is applicable for inserting into the first port of the portable electronic device so as to electrically couple to the keyboard plug.

In the external keyboard of the portable electronic device, the keyboard plug can comprise a plurality of pins, and the second port comprises a plurality of electrodes insulated from each other and corresponding to the plurality of pins respectively. Each of the plurality of electrodes is coupled to each of the plurality of scan signal lines correspondingly.

In the external keyboard of the portable electronic device, one of the electrodes is an interrupt input terminal.

In the external keyboard of the portable electronic device, the second port is coupled to the main body through a rigid connecting rod. When the external keyboard is connected to the portable electronic device, the rigid connecting rod is capable of supporting the portable electronic device.

The present invention further provides a portable electronic device comprising a first port. The first port comprises a circular earphone plug and a keyboard plug, wherein the keyboard plug is applicable for electrically coupling a second port of an external keyboard.

In the portable electronic device, the earphone plug can be a 3.5 mm standard earphone jack or a 2.5 mm standard earphone jack.

The portable electronic device and its external keyboard designed in the present invention are improved to apply to the earphone jack of the external keyboard. The external keyboard can be coupled to the earphone jack in a plug-and-play fashion without necessity to add a new port such that the external keyboard can be used and carried conveniently and be rotated in any arbitrary angle.

BRIEF DESCRIPTION OF THE DRAWINGS

The foregoing objects, characteristics and advantages of the present invention will be understood more fully from the detailed description given below and from the accompanying drawings of various embodiments of the invention.

DETAILED DESCRIPTION OF THE PREFERRED EMBODIMENTS

Those of ordinary skilled in the art will realize that the following detailed description of the exemplary embodiments is illustrative only and is not intended to be in any way limiting. Other embodiments will readily suggest themselves to such skilled persons having the benefit of this disclosure. Reference will now be made in detail to implementations of the exemplary embodiments as illustrated in the accompanying drawings. The same reference indicators will be used throughout the drawings and the following detailed description to refer to the same parts. All claimed subjects are not limited to mobile phones but are applicable to all portable electronic devices.

Figure 1:
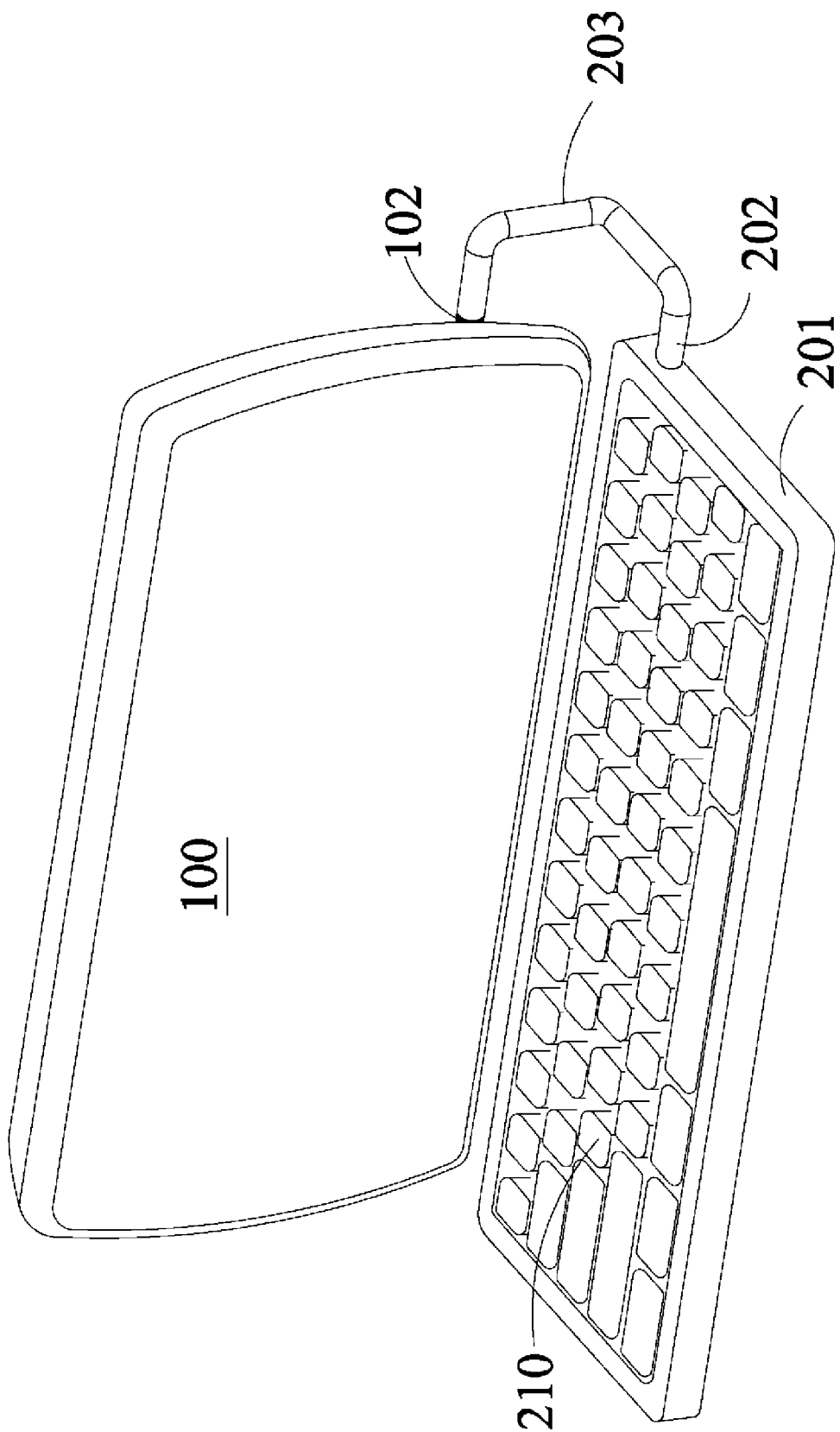
FIG. 1 illustrates a schematic diagram of an external keyboard coupled to a mobile phone in accordance with an embodiment of the present invention.

Please refer to FIG. 1 illustrating a schematic diagram of an external keyboard coupled to a mobile phone in accordance with an embodiment of the present invention. As shown in FIG. 1, a first port 102 is disposed on a main body of a mobile phone 100. An external keyboard 200 comprises a main body 201 of a keyboard and a second port 202. A rigid connecting rod 203 is provided for coupling the main body 201 and the second port 202. In the embodiment of the present invention, the keyboard layout of the external keyboard 200 is not specifically limited. The external keyboard 200 can be a usual digital keyboard, a QWERTY keyboard or any other kind of keyboard.

The second port 202 is used for inserting into the first port 102 of the mobile phone 100 so as to transmit keyboard scan signals. The first port 102 of the mobile phone 100 is modified from a traditional circular jack, such as a 3.5 mm standard earphone jack or a 2.5 mm standard earphone jack, to increase the port used to the keyboard. Thus, the first port 102 of the mobile phone 100 is capable of matching with the second port 202 of the external keyboard 200, and one embodiment of the specific structure will be described below in reference with FIG. 3. Upon the external keyboard 200 connecting to the mobile phone 100, the connecting rod 203 provides support between the external keyboard 200 and the mobile phone 100, and makes a certain angle formed between the external keyboard 200 and the mobile phone 100. The configuration can be similar to an opened laptop. Thus, the screen can be watched and the keyboard can be operated with convenience. Due to the shape characteristic of the circular earphone jack, the external keyboard 200 can be freely rotated in any angle relative to the mobile phone 100.

In other embodiments, the rigid connecting rod 203 can be replaced by a flexible connecting rod with an adjustable shape, or a soft electrical connecting wire.

Figure 3:
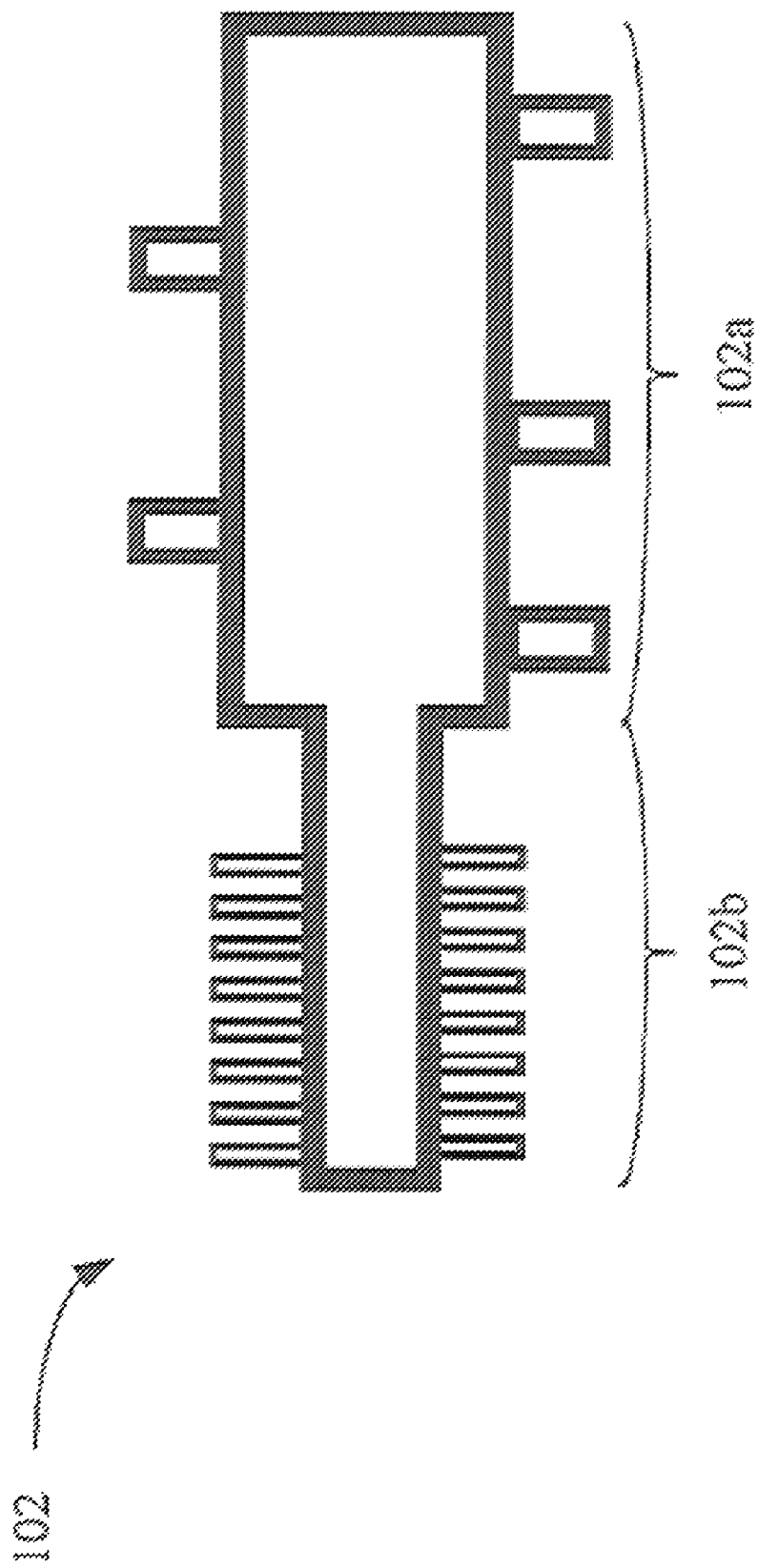
FIG. 3 illustrates a schematic diagram of a modified earphone jack in a mobile phone in accordance with an embodiment of the present invention.

Please refer to FIG. 3 illustrating a schematic diagram of a modified earphone jack in a mobile phone in accordance with an embodiment of the present invention. As shown in FIG. 3, for the first port 102 in this embodiment, an original earphone jack is added with a plurality of pins. Specifically, the first port 102 comprises an earphone plug 102a and a keyboard plug 102b. In order to not affect the normal usage of the earphone, the earphone plug 102a is, for example, near to the outer casing of the mobile phone, and the keyboard plug 102b is away from the outer casing of the mobile phone. The earphone plug 102a is, for example, same as a common 3.5 mm standard earphone jack or 2.5 mm standard earphone jack, or other circular earphone jacks. Moreover, the internal diameter of the earphone plug 102a is substantially smaller than the internal diameter of the keyboard plug 102b. The keyboard plug 102b comprises the plurality of pins. The number of the pins of the keyboard plug 102b is determined according to the type of the keyboard. For instance, if the keyboard is a QWERTY keyboard, sixteen pins can be used; if the keyboard is a common digital keyboard, six pins can be used.

Figure 2:
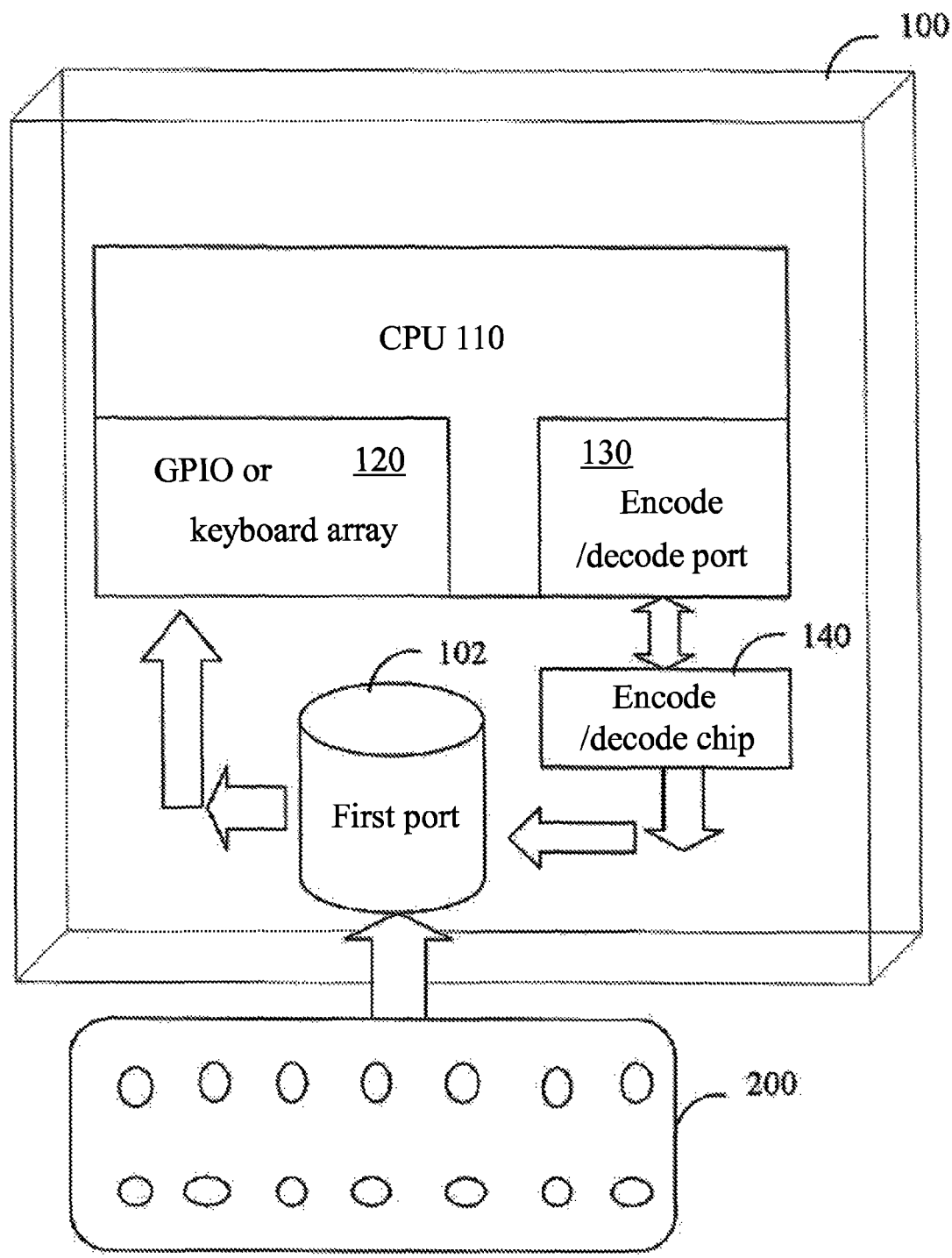
FIG. 2 illustrates an internal structure diagram of a mobile phone and a keyboard in accordance with an embodiment of the present invention.

Please refer to FIG. 2 illustrating an internal structure diagram of a mobile phone and a keyboard in accordance with an embodiment of the present invention. As shown in FIG. 2, the mobile phone 100 comprises a GPIO or keyboard array 120, a CPU 110 of an encode/decode port 130, an encode/decode chip 140 and the first port 102. Wherein, different from the structure of the first port 102 alone connected with the encode/decode chip 140 in the prior art, the first port 102 is connected with the GPIO or the keyboard array 120 and the encode/decode chip 140, and used as the port of the external keyboard 200 in this embodiment.

On the other hand, the external keyboard 200 comprises a keyboard array 210 and the second port 202, wherein the row scan signal lines and column scan signal lines of the keyboard array 210 are electrically coupled to the second port 202.

Figure 4:
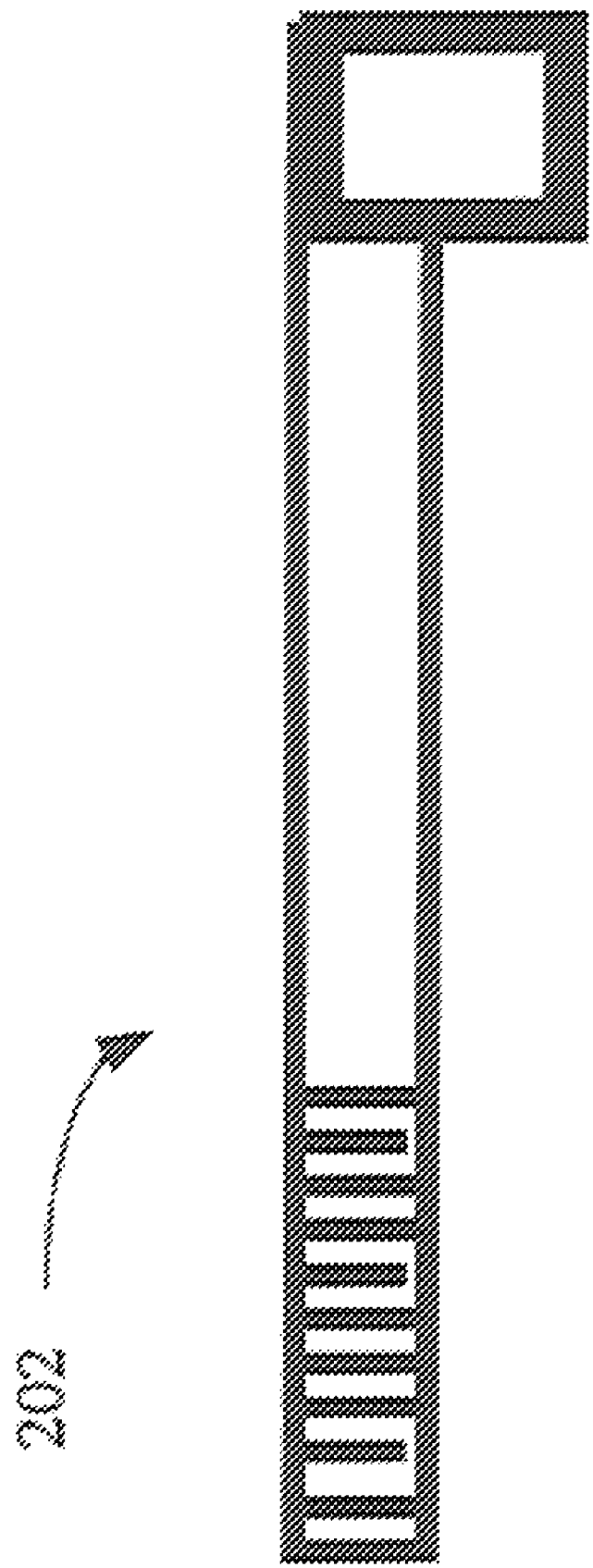
FIG. 4 illustrates a schematic diagram of a port in an external keyboard in accordance with an embodiment of the present invention.
Figure 5:
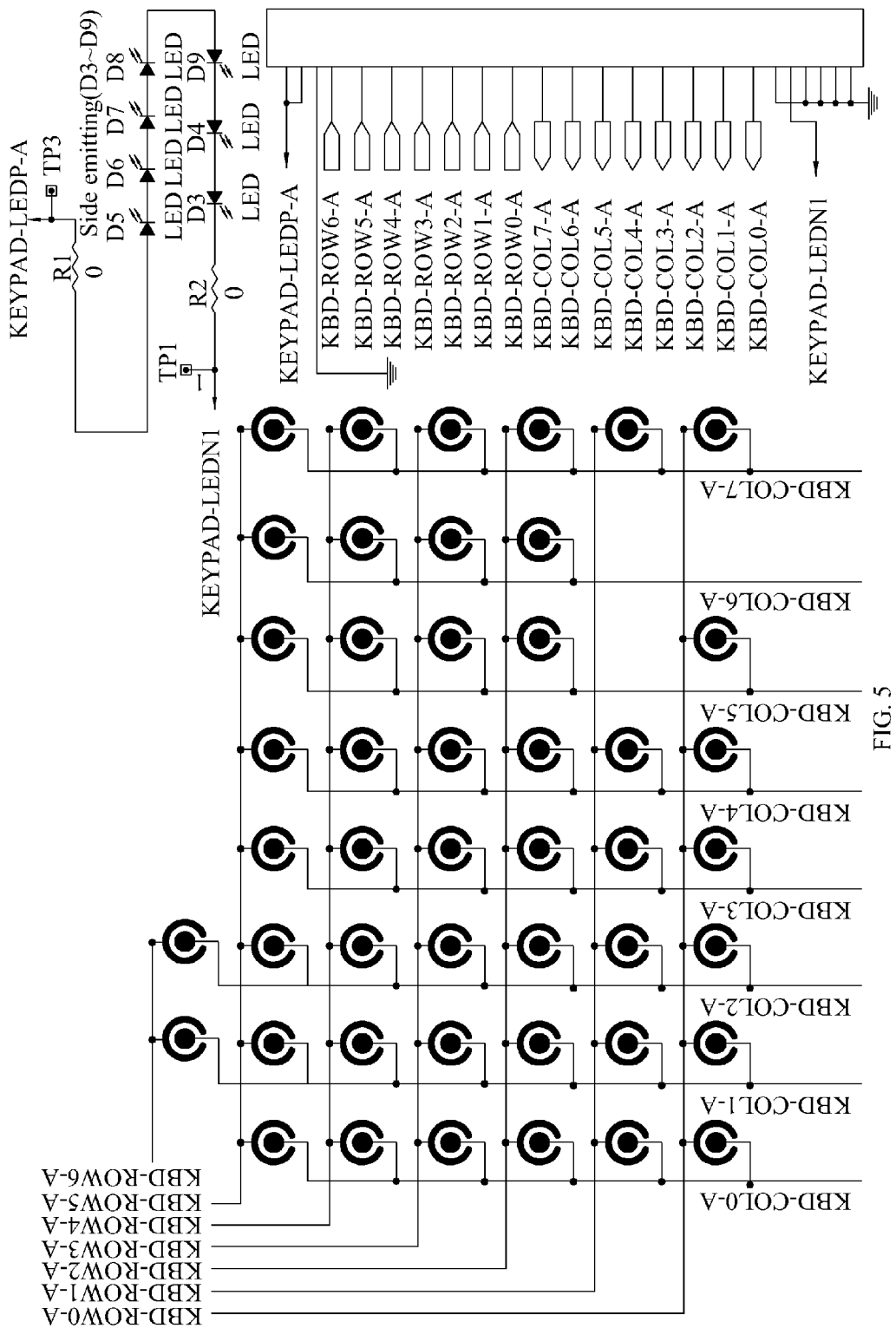
FIG. 5 illustrates a circuit diagram of an external keyboard in accordance with an embodiment of the present invention.

Please refer to FIG. 4 illustrating a schematic diagram of a second port in an external keyboard in accordance with an embodiment of the present invention. As shown in FIG. 4, the second port 202 is substantially cylindrical, and comprises a plurality of connecting electrodes corresponding to the plurality of pins of the keyboard plug 102b of the first port 102 respectively. The connecting electrodes are electrically insulated from each other. Each of the connecting electrodes is coupled to each of the scan signal lines of the keyboard array 210 correspondingly, and the specific circuit diagram is shown as FIG. 5.

In another embodiment of the present invention, in order to generate an interrupt input while the external keyboard 200 is coupled to the mobile phone 100, one of the connecting electrodes of the second port 202 is an interrupt input terminal.

When the mobile phone 100 does not be inserted with the external keyboard 200, it is only a bar phone, such as Apple's iPhone. When it is necessary to use the keyboard, such as playing a game or sending e-mail, the second port 202 of the external keyboard 200 is inserted into the first port 102 of the mobile phone 100. At this time, the second port 202 passes through the earphone plug 102a within the first port 102 so as to electrically couple to the keyboard plug 102b. Furthermore, the CPU 110 of the mobile phone 100 generates an interrupt notice to enable a earphone module. Then, a keyboard module can be active by the CPU 110. Therefore, the external keyboard 200 can be used and its angle can be adjusted arbitrarily.

Consequently, the external keyboard according to the embodiment of the present invention can be coupled to the earphone jack in a plug-and-play fashion without necessarity to add a new port such that the external keyboard can be convenient to use and carry and be rotated in any arbitrary angle.

While particular embodiments of the present invention have been shown and described, it will be obvious to those skilled in the art that, based upon the teachings herein, changes and modifications may be made without departing from this invention and its broader aspects. Therefore, the appended claims are intended to encompass within their scope of all such changes and modifications as are within the true spirit and scope of the exemplary embodiments of the present invention.

What is claimed is:

1. An external keyboard of a portable electronic device, coupled to a first port of the portable electronic device, the first port comprising a circular earphone plug and a keyboard plug, and the external keyboard comprising:
    a main body;
    a keyboard array disposed on the main body and comprising a plurality of scan signal lines; and
    a second port electrically coupled to the scan signal lines of the keyboard array and being capable of inserting into the first port of the portable electronic device so as to electrically couple to the keyboard plug.

2. The external keyboard of a portable electronic device as recited in claim 1, wherein the keyboard plug comprises a plurality of pins, and the second port comprises a plurality of electrodes insulated from each other and corresponding to the plurality of pins respectively, and each of the plurality of electrodes is coupled to each of the plurality of scan signal lines correspondingly.

3. The external keyboard of a portable electronic device as recited in claim 2, wherein one of the electrodes is an interrupt input terminal.

4. The external keyboard of a portable electronic device as recited in claim 1, wherein the second port is coupled to the main body through a rigid connecting rod, and the rigid connecting rod is capable of supporting the portable electronic device when the external keyboard is connected to the portable electronic device.

5. A portable electronic device, comprising:
    a first port comprising a circular earphone plug and a keyboard plug, wherein the keyboard plug is applicable for electrically coupling a second port of an external keyboard.

6. The portable electronic device as recited in claim 5, wherein the keyboard plug comprises a plurality of pins, and the second port comprises a plurality of electrodes insulated from each other and corresponding to the plurality of pins respectively.

7. The portable electronic device as recited in claim 5, wherein the earphone plug is a 3.5 mm standard earphone jack or a 2.5 mm standard earphone jack.

* * * * *